US012773961B2

(12) United States Patent
Grasso et al.

(10) Patent No.: US 12,773,961 B2
(45) Date of Patent: Oct. 27, 2026

(54) POWER SUPPLY SYSTEM FOR A CONTROL MEANS RESIDING IN A VEHICLE INTENDED TO BE PART OF A CONVOY OF VEHICLES, CONVOY OF VEHICLE AND METHOD FOR SUPPLYING POWER TO A CONTROL MEANS

(71) Applicant: Faiveley Transport Italia S.P.A., Piossasco (IT)

(72) Inventors: Angelo Grasso, Canelli (IT); Matteo Frea, Cantalupa (IT); Luc Imbert, Turin (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 0 days.

(21) Appl. No.: 19/132,759

(22) PCT Filed: Nov. 23, 2023

(86) PCT No.: PCT/IB2023/061838

§ 371 (c)(1),
(2) Date: May 23, 2025

(87) PCT Pub. No.: WO2024/110916

PCT Pub. Date: May 30, 2024

(65) Prior Publication Data

US 2026/0192764 A1 Jul. 9, 2026

(30) Foreign Application Priority Data

Nov. 25, 2022 (IT) ........................ 102022000024345

(51) Int. Cl.
*B60R 16/033* (2006.01)
*B60R 16/023* (2006.01)
(Continued)

(52) U.S. Cl.
CPC ........ *B60R 16/033* (2013.01); *B60R 16/0231* (2013.01); *B60R 16/027* (2013.01); *H02J 7/34* (2013.01); *H02J 7/855* (2026.01)

(58) Field of Classification Search
CPC . B60R 16/033; B60R 16/0231; B60R 16/027; H02J 7/34; H02J 7/855
See application file for complete search history.

(56) References Cited

U.S. PATENT DOCUMENTS 6,087,739 A * 7/2000 Jalliffier ................... B61G 5/10
191/4
2013/0110430 A1* 5/2013 Nishi ................... G01R 31/382
702/63
(Continued)

FOREIGN PATENT DOCUMENTS

WO 2024110916 A1 5/2024

OTHER PUBLICATIONS

International Search Report and Written Opinion for corresponding PCT/IB2023/061838, dated Feb. 2, 2024.

*Primary Examiner* — Regis J Betsch
*Assistant Examiner* — Alex W Lam
(74) *Attorney, Agent, or Firm* — K&L Gates LLP

(57) ABSTRACT

A power supply system is described for a control means residing in a vehicle (V) intended to be part of a convoy of vehicles. The power supply system is arranged to receive a low-voltage power supply and at least on tail vehicle signal. The power supply system is furthermore arranged to use the low-voltage power supply to generate the output supply voltage, when:
- the tail vehicle signal indicates that the vehicle is a tail vehicle;
- the power supply system does not receive the high-voltage power supply; and (Continued)

a local power energy storage means is not capable of providing a supplementary power supply greater than or equal to said predetermined minimum power supply.

Also described is a convoy of vehicles and a method for supplying power, by means of a power supply system, to a control means residing in a vehicle intended to be part of a convoy of vehicles.

15 Claims, 12 Drawing Sheets

(51) Int. Cl.

| | |
|---|---|
| ***B60R 16/027*** | (2006.01) |
| ***H02J 7/00*** | (2026.01) |
| ***H02J 7/34*** | (2006.01) |

(56) References Cited

U.S. PATENT DOCUMENTS

2013/0113279 A1* 5/2013 Hatanaka ................ B60L 53/36 307/9.1

2015/0061377 A1* 3/2015 Ishikawa ................. B61C 17/06 307/9.1

* cited by examiner

POWER SUPPLY SYSTEM FOR A CONTROL MEANS RESIDING IN A VEHICLE INTENDED TO BE PART OF A CONVOY OF VEHICLES, CONVOY OF VEHICLE AND METHOD FOR SUPPLYING POWER TO A CONTROL MEANS

CROSS-REFERENCE TO RELATED APPLICATIONS

This application is a U.S. National Stage Entry under 35 U.S.C. § 371 of International Patent Application No. PCT/IB2023/061838, entitled POWER SUPPLY SYSTEM FOR A CONTROL MEANS RESIDING IN A VEHICLE INTENDED TO BE PART OF A CONVOY OF VEHICLES, CONVOY OF VEHICLE AND METHOD FOR SUPPLYING POWER TO A CONTROL MEANS, filed Nov. 23, 2023, which claims priority to Italian Application No. 102022000024345, filed Nov. 25, 2022, the entire disclosures of which are hereby incorporated by reference herein.

TECHNICAL FIELD

The present invention finds place, in general, within the vehicle convoy sector; in particular the invention refers to a power supply system for a control means residing in a vehicle intended to be part of a convoy of vehicles, particularly at least one railway vehicle intended to be part of a railway convoy, to a convoy of vehicles, particularly a convoy of railway vehicles, and to a method for supplying power, via a power supply system, to a control means residing in a vehicle intended to be part of a convoy of vehicles.

PRIOR ART

As may be observed from FIG. 1, convoys 100 usually comprise a plurality of vehicles VH, VI1, VI2, EOT which are interconnected therebetween.

The prior art will be described hereinafter with particular reference to the field of railway vehicles. In any case, what is described herein may also find similar application in vehicles belonging to other sectors, for example road vehicles or similar.

A railway convoy usually comprises at least one lead or locomotive vehicle VH, and at least one tail vehicle EOT ("End-Of-Train"), which terminates the railway convoy. Between the tail vehicle EOT and the lead or locomotive vehicle VH there may be arranged one or more intermediate vehicles VI1 and VI2.

Usually, convoys of railway vehicles may comprise a power supply line (known in the railway sector as a "Train Power line") that may transmit power.

For example, the power supply line may be used to transmit a high-voltage power supply (high power mode—for example 400 Vac). The high-voltage power supply may be generated for example by a high-voltage power supply means, such as, for example, a pantograph arranged to draw the high-voltage power supply from a high-voltage line that is external to the vehicle. The high-voltage power supply provided by the high-voltage power supply means may be used to energize both a control means of a lead vehicle of the convoy and the other control means of the other vehicles of the convoy (such as the control means of a tail vehicle EOT, "End-Of-Train", of the convoy).

As mentioned above, the lead or locomotive vehicle VH usually comprises at least one control means (for example a control unit) arranged to perform at least one predetermined specific function for a lead or locomotive vehicle.

For example, the predetermined specific function for a lead or locomotive vehicle may be one of, for example:

- to provide a man/machine interface for the functioning of the convoy;
- to provide a visualization of useful data to the driver;
- to provide controls that allow the driver to impart traction and braking commands to the convoy;
- to monitor the presence of the tail vehicle (EOT, "End Of Train");
- to provide a control signal to deactivate the high-voltage power supply line of the convoy, whenever communication with the tail vehicle, EOT, is interrupted or suspended.

As mentioned above, the lead or locomotive vehicle EOT usually also comprises at least one control means (for example a control unit) arranged to perform at least one predetermined specific tail vehicle function.

The predetermined specific tail vehicle control function may be, for example, one of:

- a convoy integrity check function;
- an energization control function of a high-voltage power transmission line.

Furthermore, the tail vehicle EOT comprises another local power energy storage means (for example a battery) arranged to be installed in said tail vehicle and adapted to provide a supplementary power supply voltage.

In the prior art, the local power energy storage means may be used as a source of back-up power to supply the electronic control means of the tail vehicle when the power supply line cannot supply high-voltage power energy supply.

However, disadvantageously, when the local power energy storage means is discharged, it cannot be used as a source of back-up power. In such case, insofar as neither the high-voltage power energy supply nor the back-up power is available, the control means of the tail vehicle would remain without power and would not be capable of performing the at least one specific tail vehicle function.

SUMMARY OF THE INVENTION

One object of the present invention is that of providing a solution that allows a control means of a tail vehicle to also be supplied in the absence of a high-voltage power supply ("high power") and under conditions of a discharged local power energy storage means, for example with the aim of being capable of performing at least one specific tail vehicle control function with a high level of availability.

In summary, the present invention is based upon the concept of introducing a low-voltage back-up power supply ("low power") that may be used selectively only by the control means of the tail vehicle, EOT, of the convoy.

The aforementioned and other objects and advantages are reached, according to one aspect of the invention, by a power supply system for a control means residing in a vehicle intended to be part of a convoy of vehicles having the characteristics defined in claim 1, according to a second aspect of the invention, by a convoy of vehicles having the characteristics defined in claim 10, and according to a third aspect of the invention, by a method for supplying power, via a power supply system, to a control means residing in a vehicle intended to be part of a convoy of vehicles having the characteristics defined in claim 15. Preferred embodiments of the invention are defined in the dependent claims, the content of which is to be understood as an integral part of the present description.

BRIEF DESCRIPTION OF THE DRAWINGS

The functional and structural characteristics will now be described of some preferred embodiments of a power supply system for a control means residing in a vehicle intended to be part of a convoy of vehicles, a convoy of vehicles and of a method for supplying power, by means of a power supply, to a control means residing in a vehicle intended to be part of a convoy of vehicles according to the invention. Reference is made to the accompanying drawings, wherein.

DETAILED DESCRIPTION

Figure 1:
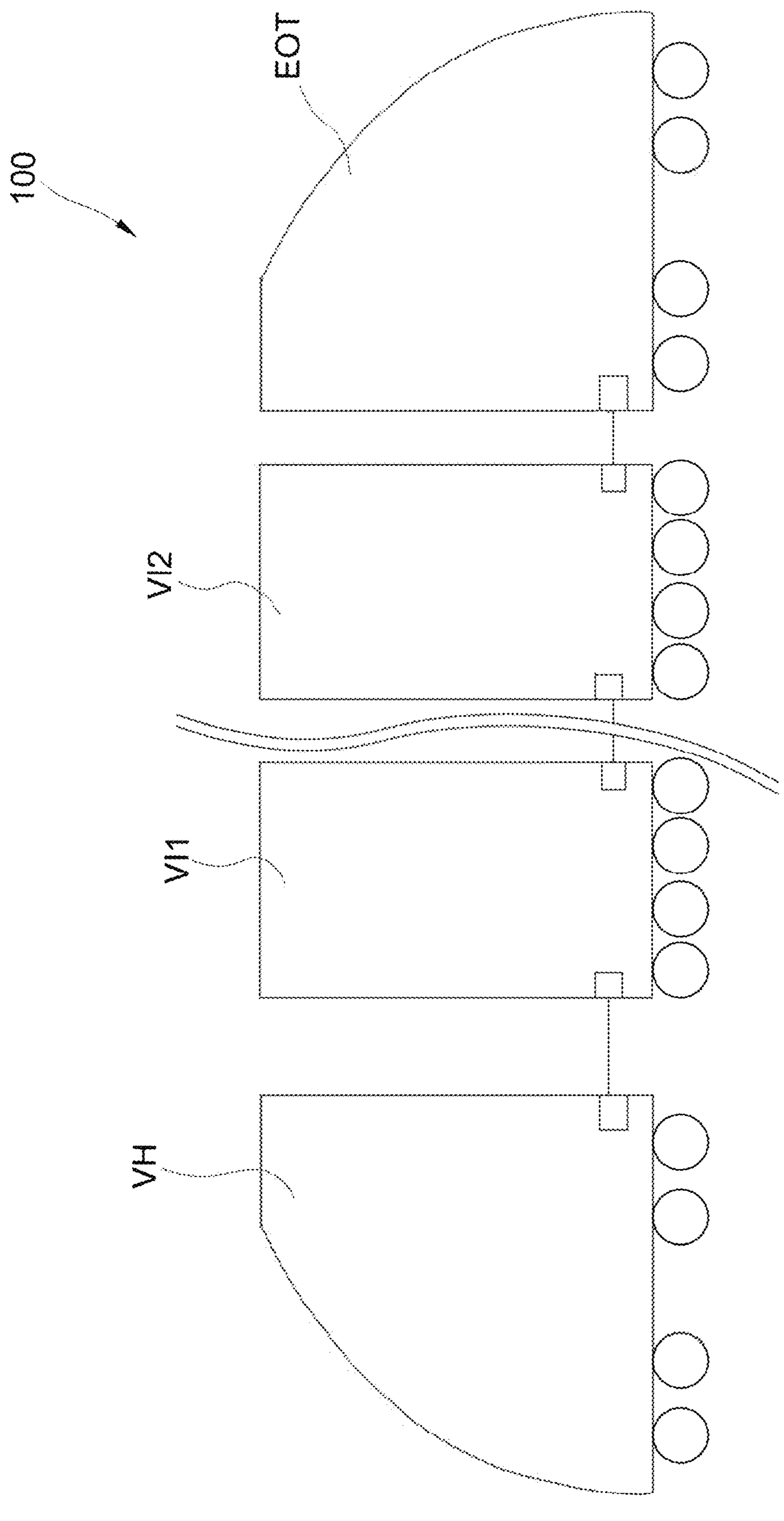
Figure 1 (PRIOR ART)
FIG. 1 shows an exemplary convoy of vehicles according to the prior art.

Before explaining in detail a plurality of embodiments of the invention, it should be clarified that the invention is not limited in the application thereof to the design details and configuration of the components presented in the following description or shown in the drawings. The invention may assume other embodiments and be implemented or constructed in practice in diverse ways. It should also be understood that the phraseology and terminology have a descriptive purpose and should not be construed as limiting. The use of "include" and "comprise" and the variations thereof are intended to cover the elements set out below and the equivalents thereof, as well as additional elements and the equivalents thereof.

Figure 2:
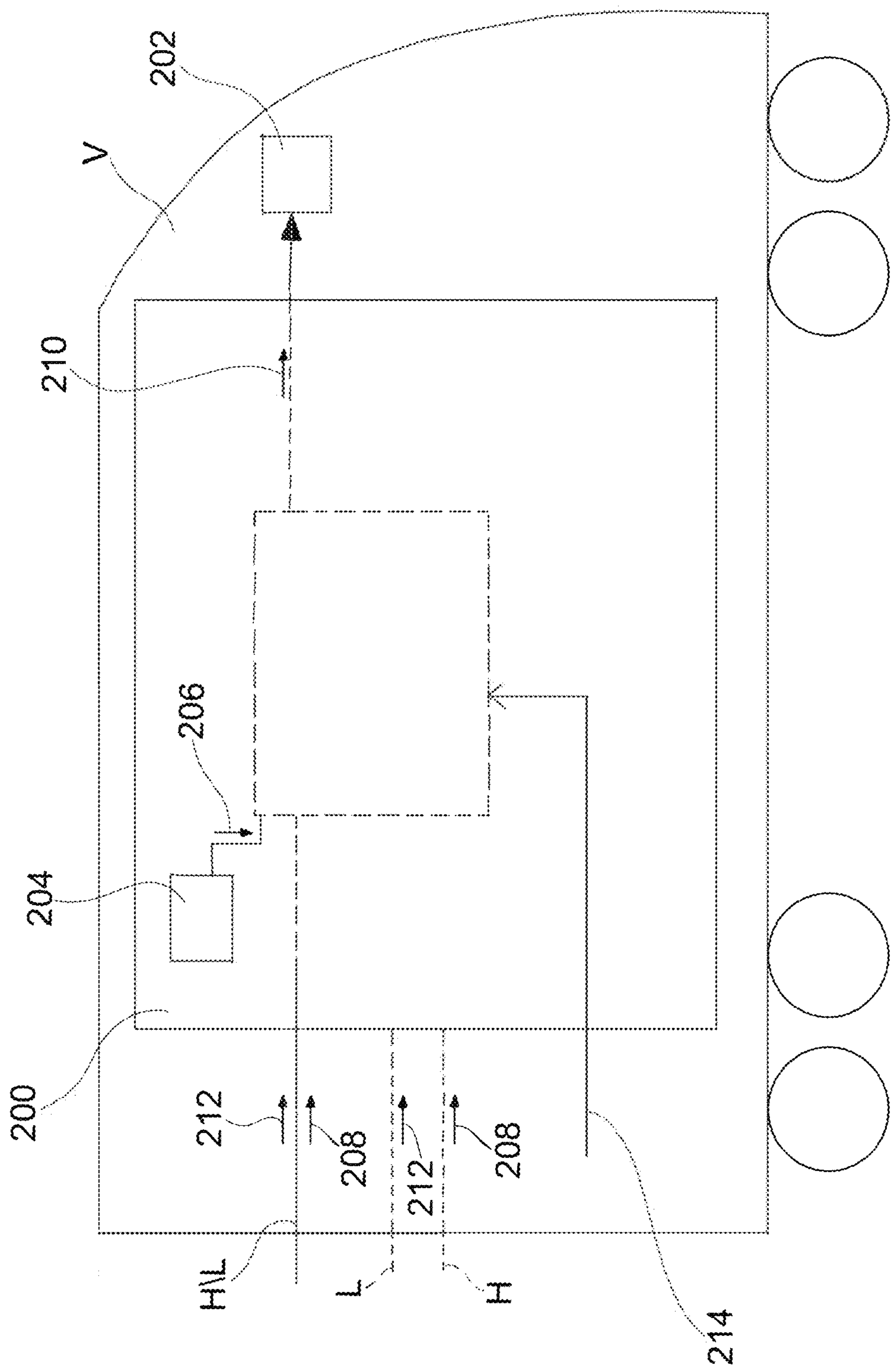
FIG. 2 shows a first embodiment of a power supply system according to the present invention.

With reference initially to FIG. 2, a first embodiment of a power supply system 200 for a control means 202 residing in a vehicle V intended to be part of a convoy of vehicles, particularly at least one railway vehicle intended to be part of a railway convoy, is described below.

As may be observed is such figure, the power supply system 200 comprises a local power energy storage means 204 arranged to be installed in said vehicle V and adapted to provide a supplementary power supply 206.

For example, the local power energy storage means 204 may be a battery.

The power supply system is arranged to receive as input a high-voltage power supply 208 and to provide as output a supply voltage 210 arranged to be supplied to the control means 202.

For example, the high-voltage power supply 208 may be supplied as input to the power supply system by means of a high/low-voltage power supply line H/L, or else an appropriate high-voltage power transmission line H.

For example, in the railway sector, a high-voltage power supply may refer to a voltage in the order of 400V (for example 400 Vac).

For example, in the railway sector, a control means power supply voltage may refer to a voltage in the order of 24V (for example 24 Vdc).

The power supply system is arranged so that:

- when it receives the high-voltage power supply 208, it uses such high-voltage power supply to generate the output supply voltage 210;
- when it does not receive the high-voltage power supply 208 and the local power energy storage means 204 is capable of supplying a supplementary power supply, greater than or equal to a predetermined minimum power supply, use the supplementary power supply 206 provided by said local power energy storage means 204 to generate the output supply voltage 210.

The power supply system is further arranged to receive a low-voltage power supply 212 and at least one tail vehicle signal 214 arranged to indicate whether the vehicle V on which the power supply system is installed is a tail vehicle of the convoy of vehicles.

For example, the low-voltage power supply 212 may be supplied as input to the power supply system by means of a high/low-voltage power supply line H/L, (that may also transmit the high-voltage power supply 208), or else an appropriate low-voltage power transmission line L.

For example, in the railway sector, a low-voltage power supply may refer to a voltage in the order of 48V (for example 48 Vdc) Furthermore, the power supply system is arranged to use the low-voltage power supply 212 to generate the output supply voltage 210, when:

- the at least one tail vehicle signal 212 indicates that the vehicle V on which the power supply system is installed is a tail vehicle;
- the power supply system does not receive the high-voltage power supply 208; and
- the local power energy storage means 204 is not capable of providing a supplementary power supply 206 greater than or equal to said predetermined minimum power supply.

In other words, the power supply system is capable of generating the voltage power supply 210 at the output for the control means 202, if installed in the tail vehicle, EOT, using the low-voltage power supply 212, when the high-voltage power supply 208 is not available or when the local power energy storage means 204 is not sufficiently charged or is completely discharged. In this way, the control means 202 of the tail vehicle may also be operational when the voltage of the high-voltage power supply 208 is not available or when the local power energy storage means 204 is not sufficiently charged or is completely discharged.

Figure 3A:
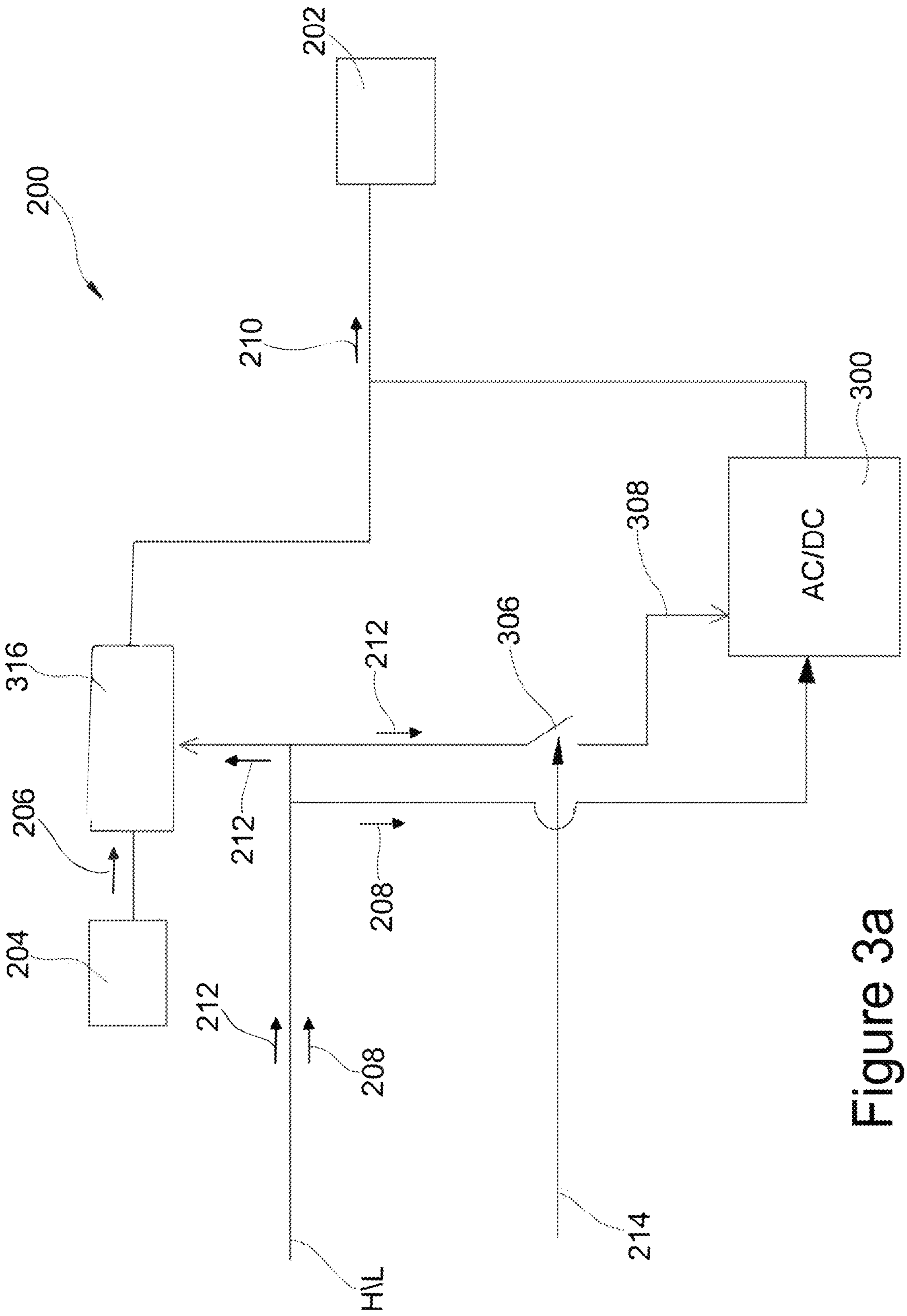
FIGS. 3*a* and 3*b* show further embodiments of a power supply system according to the present invention.
Figure 3B:
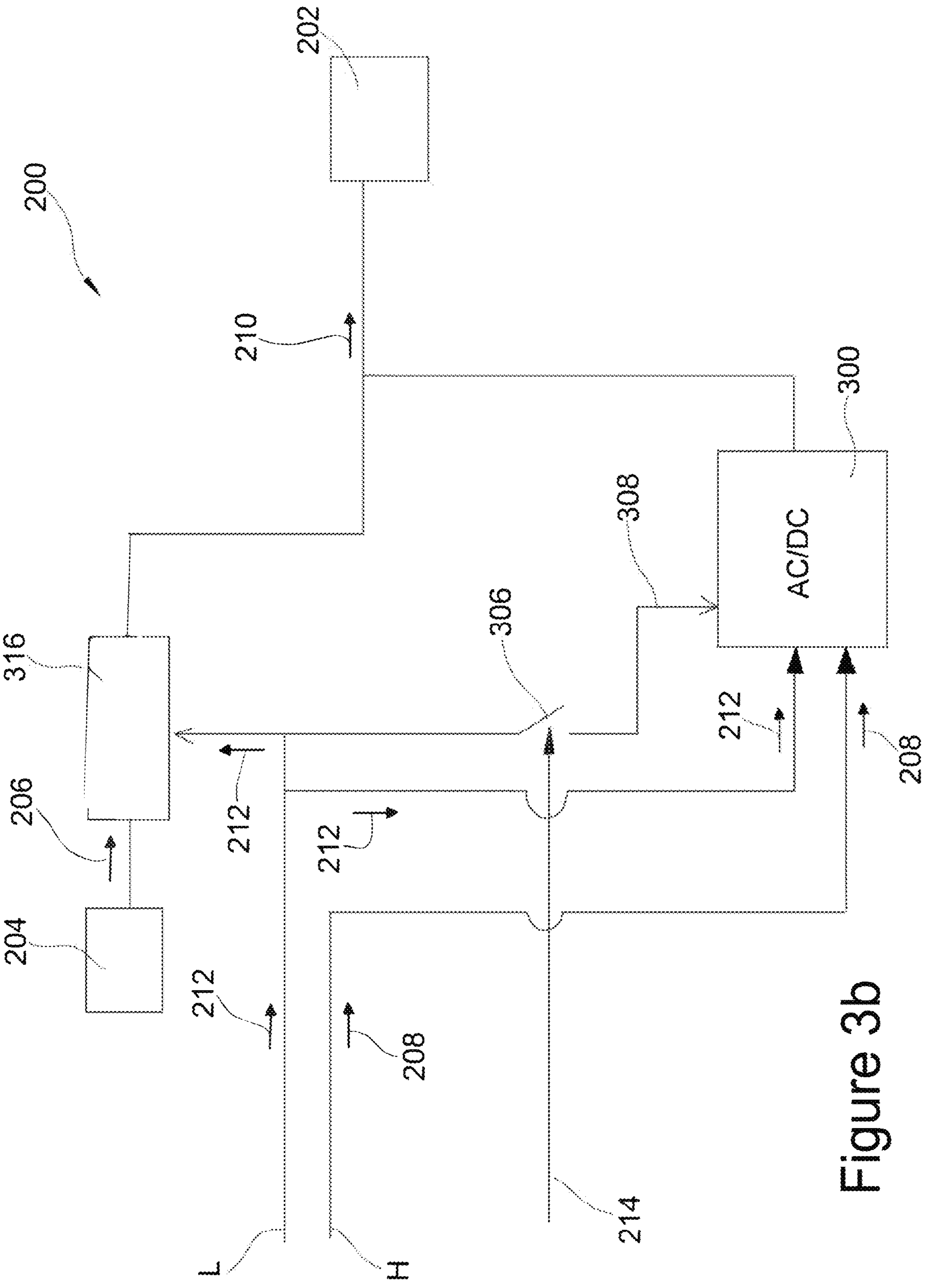

Preferably, as may be observed in FIGS. 3*a* and 3*b*, the power supply system may be arranged to receive as input the high-voltage power supply 208 in alternating-current. Furthermore, the output supply voltage 210, arranged to be provided to the control means 202, may be in direct-current.

In such a case, the power supply system may furthermore comprise a first AC/DC conversion means 300 arranged to receive the high-voltage power supply 208 in alternating-current and convert it into the output supply voltage 210 in direct-current.

In a numeric example, if the high-voltage power supply 208 in alternating-current is equal, for example, to 400 Vac, the AC/DC conversion means 300 may convert it to an output supply voltage 210 in direct-current at, for example, 24 Vdc (the control means operating voltage).

In FIG. 3*a*, an exemplary embodiment is shown, wherein both the high-voltage power supply 208 and the low-voltage power supply 212 may be provided as input to the power supply system by means of the high/low-voltage power supply line H/L.

An exemplary embodiment is shown in FIG. 3*b* wherein the high-voltage power supply 208 may be provided as input to the power supply system by means of the appropriate high-voltage power transmission line H and the low-voltage power supply 212 may be provided as input to the power supply system by means of the appropriate low-voltage power transmission line L.

Preferably, the power supply system may be arranged to receive as input the low-voltage power supply 212 in alternating-current. In such a case, the first AC/DC conversion means 300 may be arranged to receive the low-voltage power supply 212 in alternating-current and convert it to the output supply voltage 210 in direct-current.

In a numeric example, if the low-voltage power supply in alternating-current is equal, for example, to 48 Vac, the AC/DC conversion means 300 may convert it to an output supply voltage 210 in direct-current at, for example, 24 Vdc (the control means operating voltage).

Preferably, the power supply system may comprise a switching means 306 arranged to assume, depending on the tail vehicle signal 214, a first condition adapted to allow the supply of an activation signal 308 to the first AC/DC conversion means 300 and a second condition adapted to prevent the supply of the activation signal 308 to the first AC/DC conversion means 300.

For example, the switching means 306 may be arranged to:

assume the first condition when the tail vehicle signal 214 indicates that the vehicle V, on which the power supply system is installed, is a tail vehicle of the convoy of vehicles;

assume the second condition when the tail vehicle signal 214 indicates that the vehicle V, on which the power supply system is installed, is not a tail vehicle of the convoy of vehicles.

The first AC/DC conversion means 300, when it receives the activation signal 308, may be arranged to receive as input the low-voltage power supply 212 in alternating-current and convert it into the output supply voltage 210 in direct-current arranged to be supplied to the control means 202.

The first AC/DC conversion means 300, when it does not receive the activation signal 308, may be arranged, if it receives the high-voltage power supply 208 in alternating-current, to convert it into the output supply voltage 210 in direct-current arranged to be supplied to the control means 202.

The switching means 306 may, for example, be a switch. An input terminal of the switching means may receive the low power supply in alternating-current.

When the switching device is in the first condition thereof (closed condition), the switching means may allow the forwarding of the low-voltage power supply to an output terminal of the switching means in order to generate the activation signal 308.

Figure 4A:
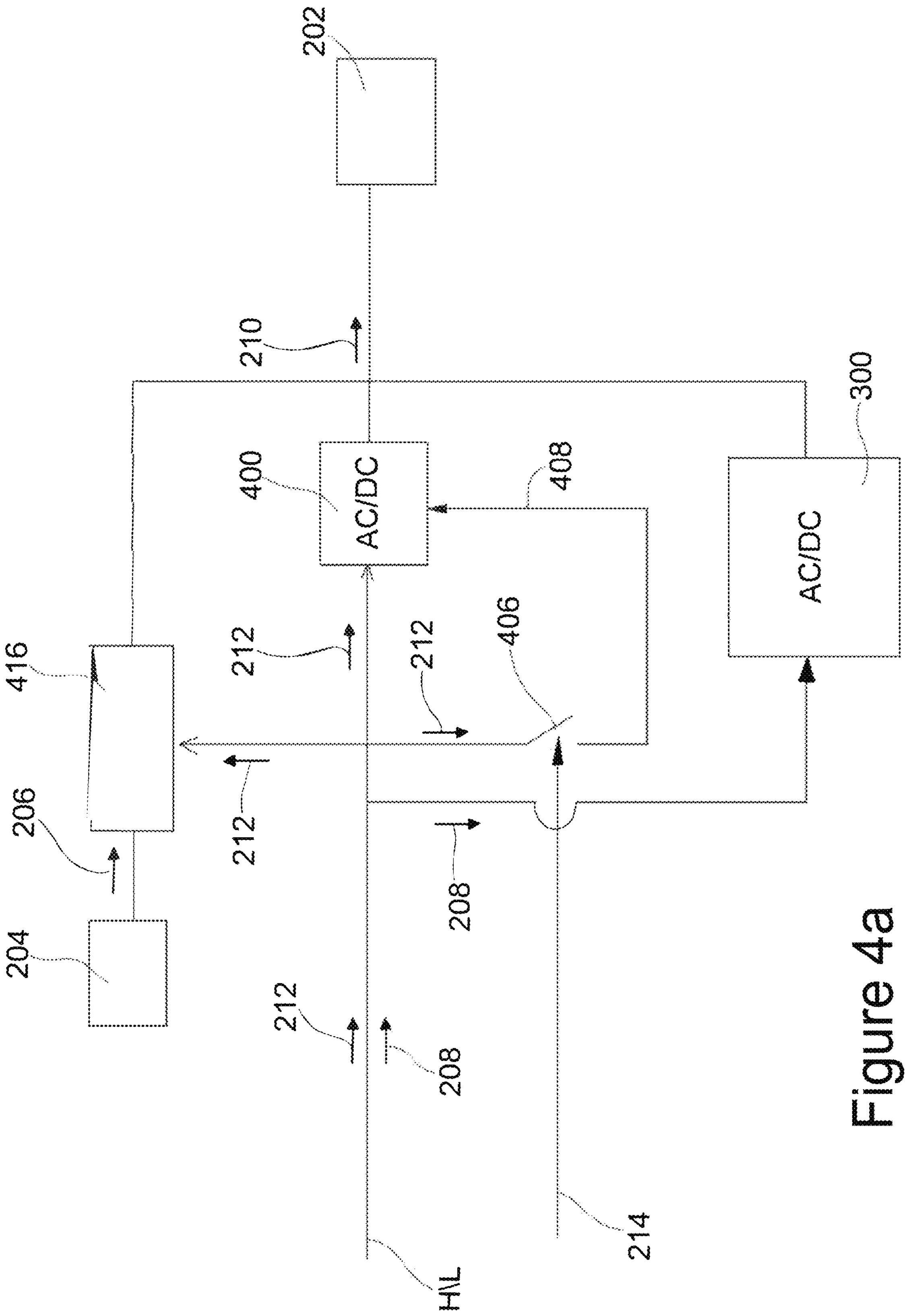
FIGS. 4*a* and 4*b* show further embodiments of a power supply system according to the present invention.
Figure 4B:
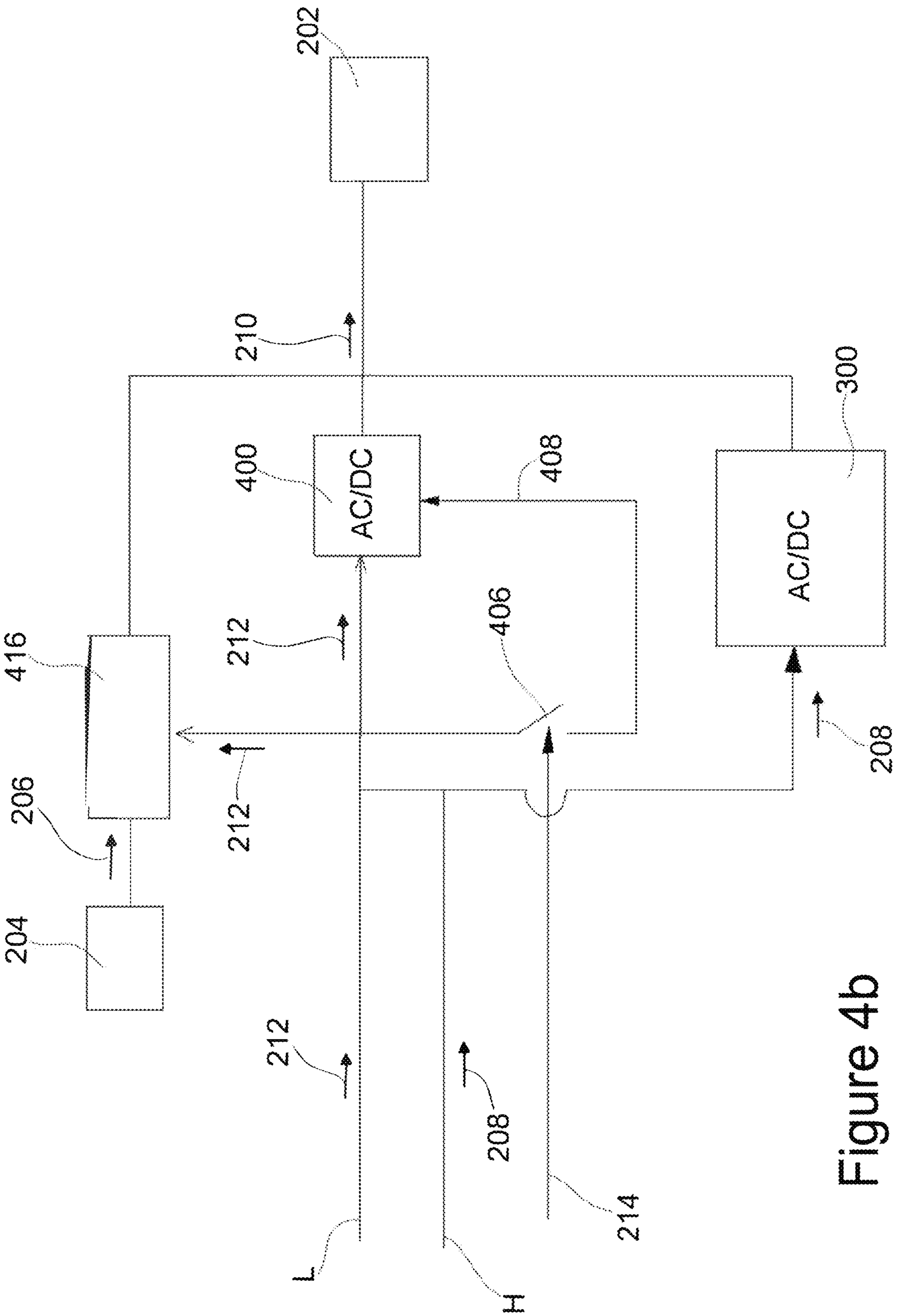

Preferably, as may be observed in FIGS. 4*a* and 4*b*, in a further embodiment, the power supply system may be arranged to receive as input the low-voltage power supply 212 in alternating-current. In such a case, the power supply system may comprise a second AC/DC conversion means 400 arranged to receive said low-voltage power supply 212 in alternating-current and convert it to the output supply voltage 210 in direct-current.

In a numeric example, if the low-voltage power supply in alternating-current is equal, for example, to 48 Vac, the second AC/DC conversion means 400 may convert it to an output supply voltage in direct-current at, for example, 24 Vdc (the control means operating voltage).

In FIG. 4*a*, an exemplary embodiment is shown wherein both the high-voltage power supply 208 and the low-voltage power supply 212 may be provided as input to the power supply system by means of a high/low-voltage power supply line H/L.

An exemplary embodiment is shown in FIG. 4*b* wherein the high-voltage power supply 208 may be provided as input to the power supply system by means of an appropriate high-voltage power transmission line H and the low-voltage power supply 212 may be provided as input to the power supply system by means of an appropriate low-voltage power transmission line L.

Preferably, the power supply system may comprise a switching means 406 arranged to assume, depending upon the tail vehicle signal 214, a first condition adapted to allow the supply of an activation signal 408 to the second AC/DC conversion means 400 and a second condition adapted to prevent the supply of the activation signal 408 to the second AC/DC conversion means 400.

For example, the switching means 406 may be arranged to:

assume the first condition when the tail vehicle signal 214 indicates that the vehicle V, on which the power supply system is installed, is a tail vehicle of the convoy of vehicles;

assume the second condition when the tail vehicle signal 214 indicates that the vehicle V, on which the power supply system is installed, is not a tail vehicle of the convoy of vehicles.

The second AC/DC conversion means 400, when it receives the activation signal 408, may be arranged to receive as input the low-voltage power supply 212 in alternating-current and convert it into the output supply voltage 210 in direct-current arranged to be supplied to the control means 202.

The second AC/DC conversion means 400, when, conversely, it does not receive the activation signal 408, may be arranged to provide no output supply voltage 410.

The switching means 406 may, for example, be a switch. An input terminal of the switching means may receive the low-voltage power supply in alternating-current. When the switching device is in the first condition thereof (closed condition), the switching means may allow the forwarding of the low-voltage power supply to an output terminal of the switching means in order to generate the activation signal 408.

Preferably, in a further embodiment, the power supply system may be arranged to receive as input the low-voltage power supply 212 in direct-current. In such a case, as may be observed, for example, in FIGS. 5*a* and 5*b*, the power supply system may comprise a DC/DC conversion means 500, arranged to receive the low-voltage power supply 212 in direct-current and convert it to the output supply voltage 210 in direct-current arranged to be provided to the control means 202.

In a numeric example, if the low-voltage power supply in direct-current is equal, for example, to 48 Vdc, the DC/DC conversion means may regulate it (for example lower it) to an output supply voltage of, for example, 24 Vdc (the control means operating voltage).

Figure 5A:
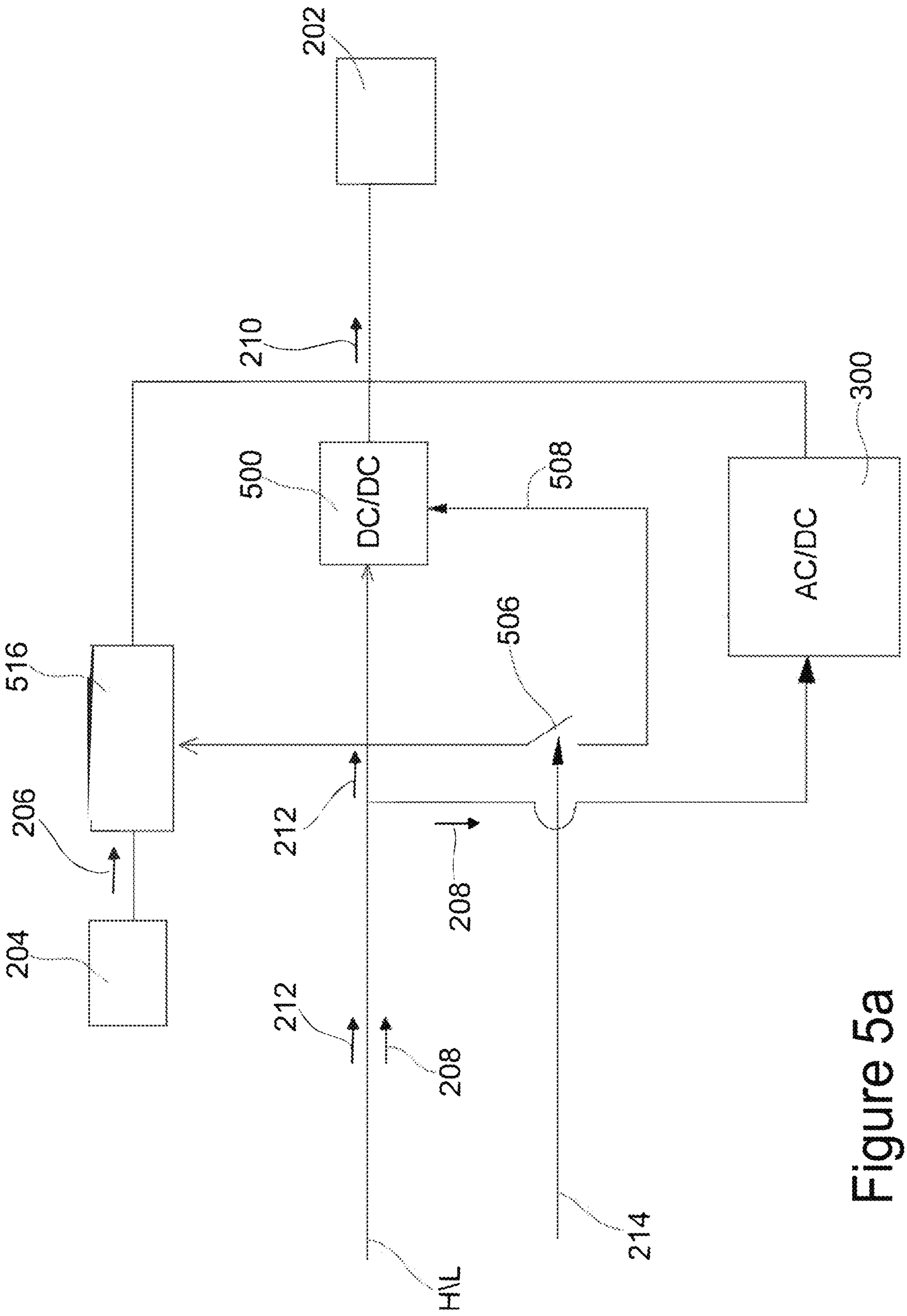
FIGS. 5*a* and 5*b* show further embodiments of a power supply system according to the present invention.

In FIG. 5*a*, an exemplary embodiment is shown wherein both the high-voltage power supply 208 and the low-voltage power supply 212 may be provided as input to the power supply system by means of a high/low-voltage power supply line H/L.

Figure 5B:
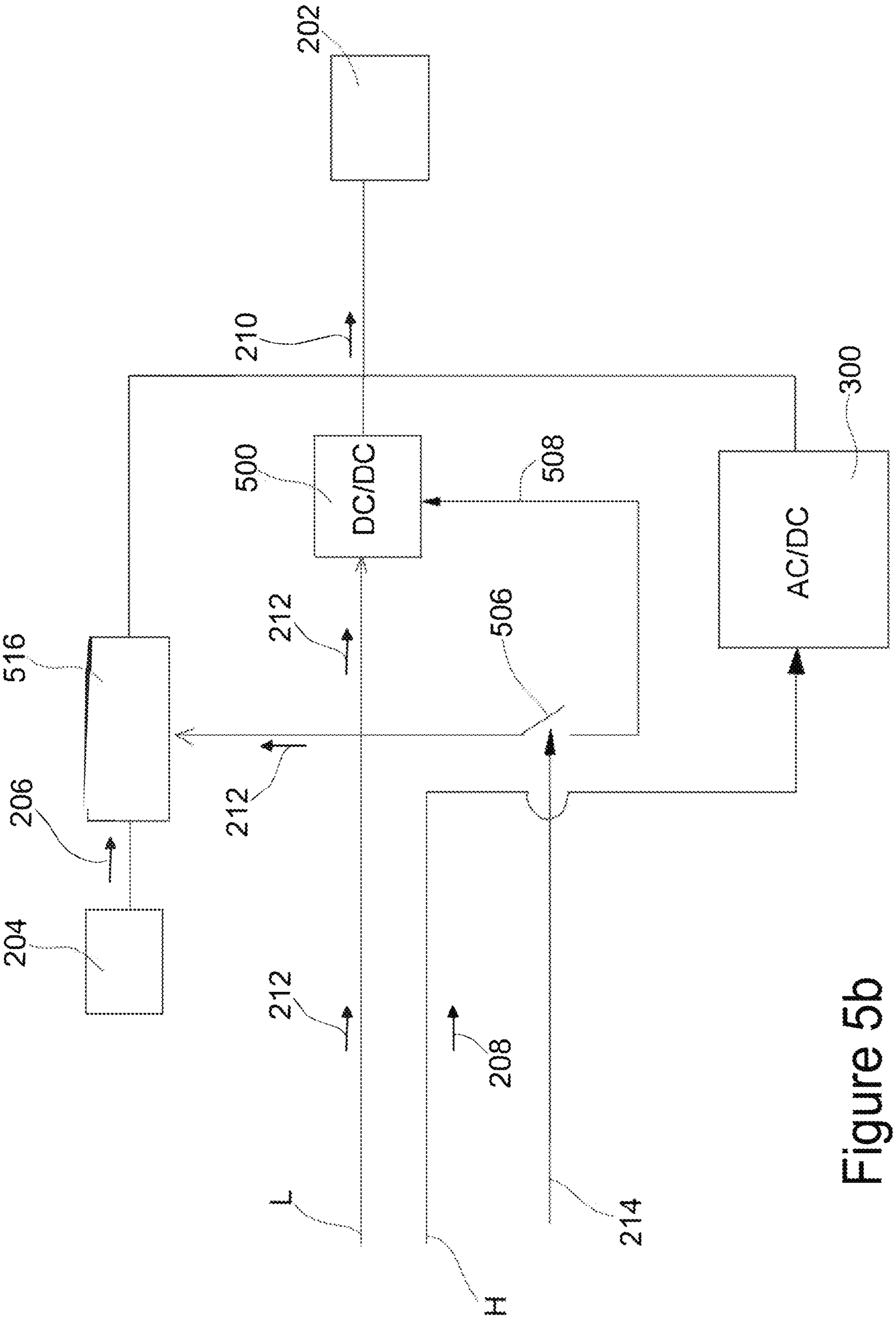

An exemplary embodiment is shown in FIG. 5*b* wherein the high-voltage power supply 208 may be provided as input to the power supply system by means of an appropriate high-voltage power transmission line H and the low-voltage power supply 212 may be provided as input to the power supply system by means of an appropriate low-voltage power transmission line L.

Preferably, the power supply system may comprise a switching means 506 arranged to assume, depending upon the tail vehicle signal 214, a first condition adapted to allow the supply of an activation signal 508 to the DC/DC conversion means 500 and a second condition adapted to prevent the supply of the activation signal 508 to the DC/DC conversion means 500.

For example, the switching means 506 may be arranged to:

- assume the first condition when the tail vehicle signal 214 indicates that the vehicle V, on which the power supply system is installed, is a tail vehicle of the convoy of vehicles;
- assume the second condition when the tail vehicle signal 214 indicates that the vehicle V, on which the power supply system is installed, is not a tail vehicle of the convoy of vehicles.

The DC/DC conversion means 500, when it receives the activation signal 508, may be arranged to receive as input the low-voltage power supply 212 in direct-current and convert it/regulate it into the output supply voltage 210 in direct-current arranged to be supplied to the control means 202.

The DC/DC conversion means 500, when, conversely, it does not receive the activation signal 508, may be arranged to provide no output supply voltage 210.

The switching means 506 may be a switch, for example. An input terminal of the switching means may receive the low-voltage in direct-current. When the switching device is in the first condition thereof (closed condition), the switching means may allow the forwarding of the low-voltage to an output terminal of the switching means in order to generate the activation signal 508.

For example, an AC/DC conversion means 300, 400 may be an AC/DC converter and an DC/DC conversion means 500 may be a DC/DC converter.

Preferably, as may be observed from FIGS. 3*a*, 3*b*, 4*a*, 4*b*, 5*a* and 5*b*, the power supply system may comprise an activation circuit 316, 416, 516 arranged to receive as input the supplementary power supply 206 provided by said local power energy storage means 203 and the low-voltage power supply 212.

When the activation circuit 316, 416, 516 receives as input the low-voltage power supply 212 and the supplementary power supply 206 is greater than said minimum power supply, the activation circuit 316, 416, 516 may be arranged to provide as output the supplementary power supply 206 supplied by the local power energy storage means 204.

The supplementary power supply as output from the activation circuit 316, 416, 516 may be provided as output to the power supply system and arranged to be provided to the control means 202.

In other words, the supplementary power supply as output from the activation circuit 316, 416, 516 may be the one used for the generation of the power supply voltage 210.

In a non-limiting exemplary embodiment, for example, the activation circuit 316, 416, 516 may be capable of determining when the power supply system does not receive the high-voltage power supply 208. In such case, when the supplementary power supply 206 is greater than the minimum power supply and is supplied as output by the activation circuit 316, 416, 516, such supplementary power supply as output from the activation circuit 316, 416, 516 may be used for the generation of the output supply voltage 210. In such case, the activation circuit 316, 416, 516 may control the AC/DC conversion means 300, or the AC/DC conversion means 400 or the DC/DC conversion means 500 in such a way as to not also provide as output the converted low-voltage power supply 212, for example by means of an appropriate control signal, not shown in the figure.

In a further aspect, the present invention also relates to a convoy of vehicles, particularly a railway convoy of railway vehicles.

Figure 6:
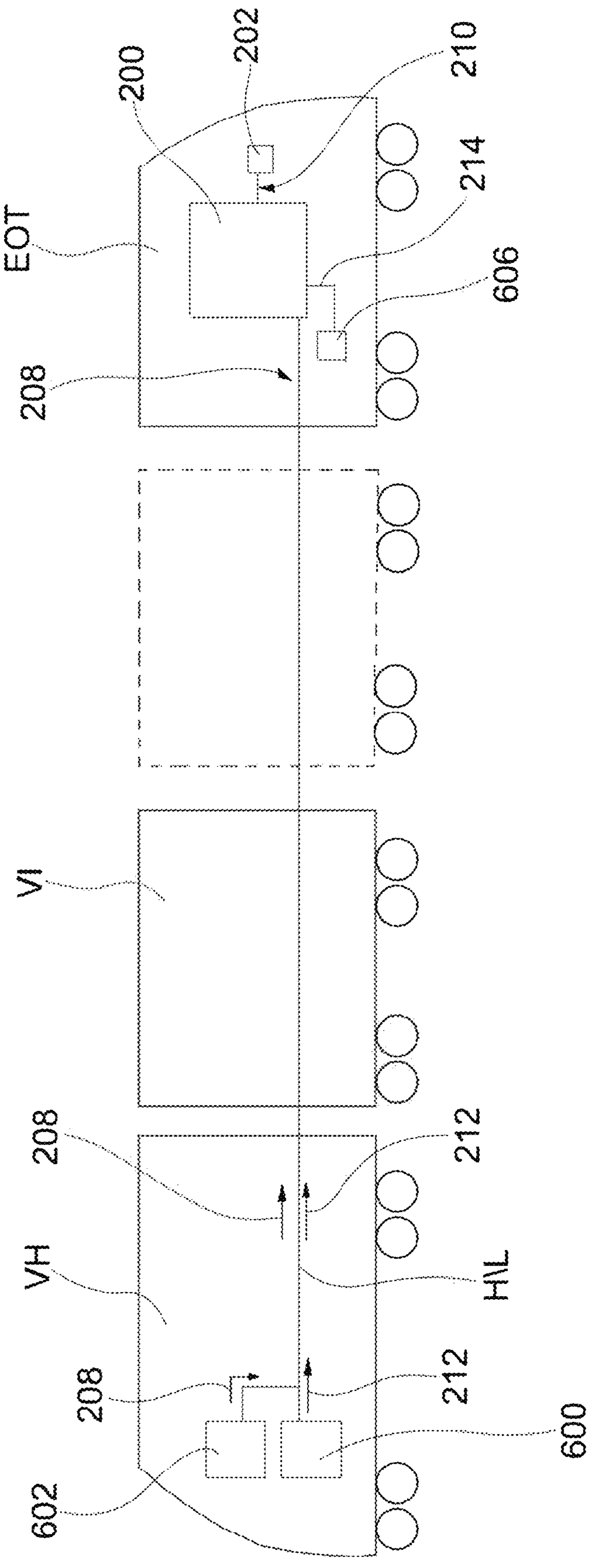
FIG. 6 shows an embodiment of a convoy according to the present invention.

As may be observed in FIG. 6, the convoy of vehicles comprises:

- at least one locomotive or lead vehicle VH;
- at least one tail vehicle, EOT.

The locomotive or lead vehicle VH comprises a high-voltage power supply means 600 arranged to provide a high-voltage power supply and a low-voltage power supply means 602 arranged to provide a low-voltage power supply.

The tail vehicle EOT comprises a power supply system 200 according to any of the previously described embodiments.

The convoy of vehicles furthermore comprises a high-voltage power transmission line H, arranged to enable the supply of the high-voltage power supply 208 from the high-voltage power supply means 600 of the locomotive or lead vehicle VH to the power supply system 200 of the tail vehicle EOT, and a low-voltage power transmission line L, arranged to enable the supply of the low-voltage power supply 212 from the low-voltage power supply means 612 of the locomotive or lead vehicle VH to the power supply system 200 of the tail vehicle EOT (the high-voltage power transmission line H and the low-voltage power transmission line L are not shown in FIG. 6). Or else, the convoy of vehicles comprises a high/low-voltage power supply line H/L arranged to allow both the supply of the high-voltage power supply 208 from the high-voltage power supply means 600 of the locomotive or lead vehicle VH to the power supply system 200 of the tail vehicle EOT and the supply of the low-voltage power supply 212 from the low-voltage power supply means 612 of the locomotive or lead vehicle VH to the power supply system 200 of the tail vehicle EOT.

The tail vehicle EOT comprises at least one control element or control device 606 arranged to generate the tail vehicle signal 214 arranged to indicate whether the vehicle on which the power supply system is installed is a tail vehicle EOT of the convoy of vehicles.

Figure 7:
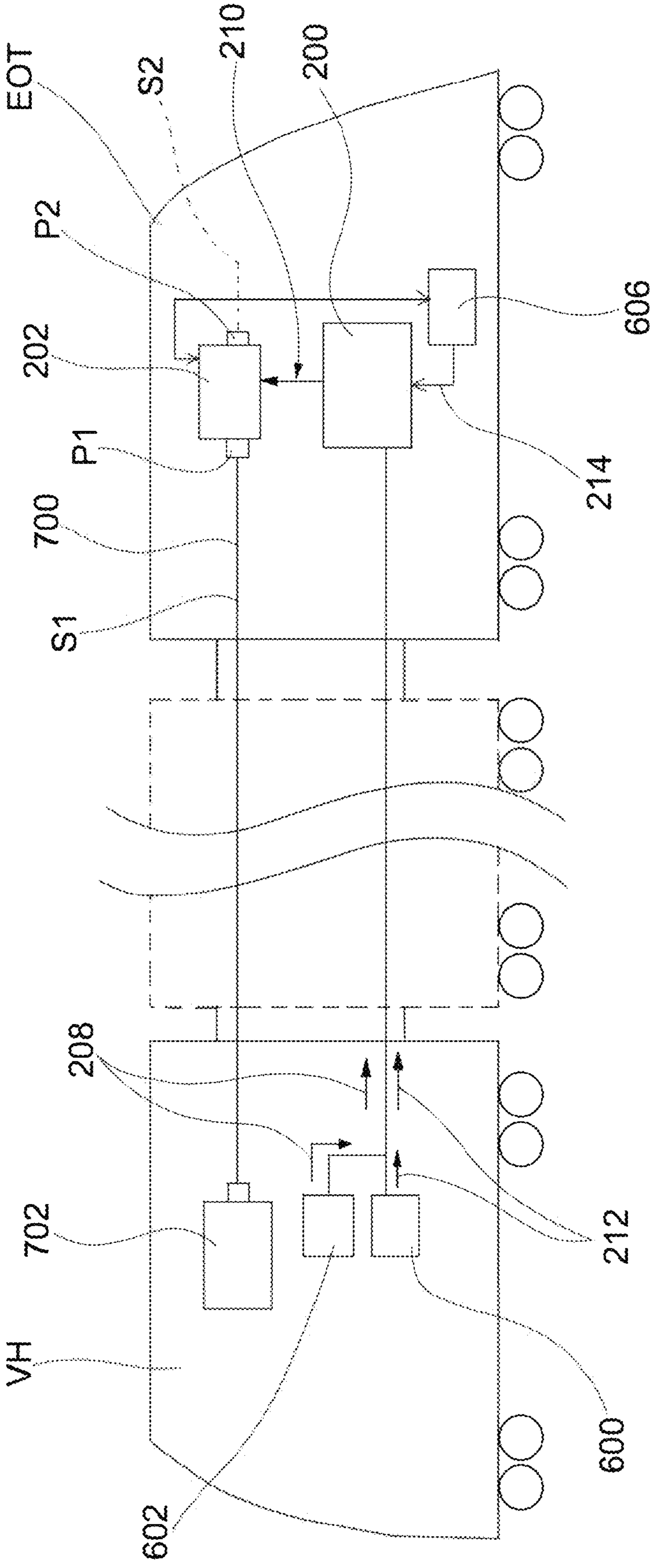
FIG. 7 shows a further embodiment of a convoy according to the present invention.

As may be observed in FIG. 7, the convoy of vehicles may comprise a communication line 700 arranged to connect a control means 702 of the lead vehicle with the control means 202 of the trail vehicle.

For example, the control means 202 and/or 702 may be or comprise at least one amongst: a processor, a microprocessor, a controller, a microcontroller, an FPGA, a PLC, a control unit, a control device, a control system, a programmable device, or similar.

The control means 202 of the tail vehicle may comprise at least one first communication port P1 and a second communication port P2, or else be associated with a first communication port P1 and a second communication port P2.

The first communication port P1 may be arranged to be connected to a first line section S1 of the communication line 700. The second communication port P2 may be arranged to be connected to a second line section S2 of the communication line 700, distinct from the first line section S1.

The control element or control device 606 may be arranged to generate the tail vehicle signal 214 when:

- the first communication port P1 of the control means 202 of the tail vehicle is connected to the first line section S1 and the second communication port P2 of the control means 202 of the tail vehicle is not connected to the second line section P2; or else
- the first communication port P1 of the control means 202 of the tail vehicle is not connected to the first line section S1 and the second communication port P2 of the control means 202 of the tail vehicle is connected to the second line section S2.

In other words, an intermediate vehicle, arranged between the lead vehicle or locomotive vehicle and the tail vehicle, will be connected to the communication line by means of both of the communication ports P1 and P2, in order to allow the relaying of messages on the first line section S1 and on the second line section S2. For example, the control means of an intermediate vehicle may receive a message or signal from a preceding vehicle by means of the first line section S1 and may forward such message or signal on the second line section S2 for a subsequent vehicle of the convoy.

Conversely, the tail vehicle being the last vehicle in the convoy, it shall not transmit/receive/forward messages or signals on the communication line for subsequent vehicles of the convoy. The control means of the tail vehicle will have only one of either the first communication port P1 or the second communication port P2 connected to the first line section S1 or to the second line section S2, originating from a previous vehicle of the convoy. When the condition exists that a control means of a vehicle is connected by means of only one port to only one line section, it is possible to determine that such vehicle is a tail vehicle.

Clearly, in each vehicle of the convoy there may be installed a respective control element or control device 606.

Figure 8:
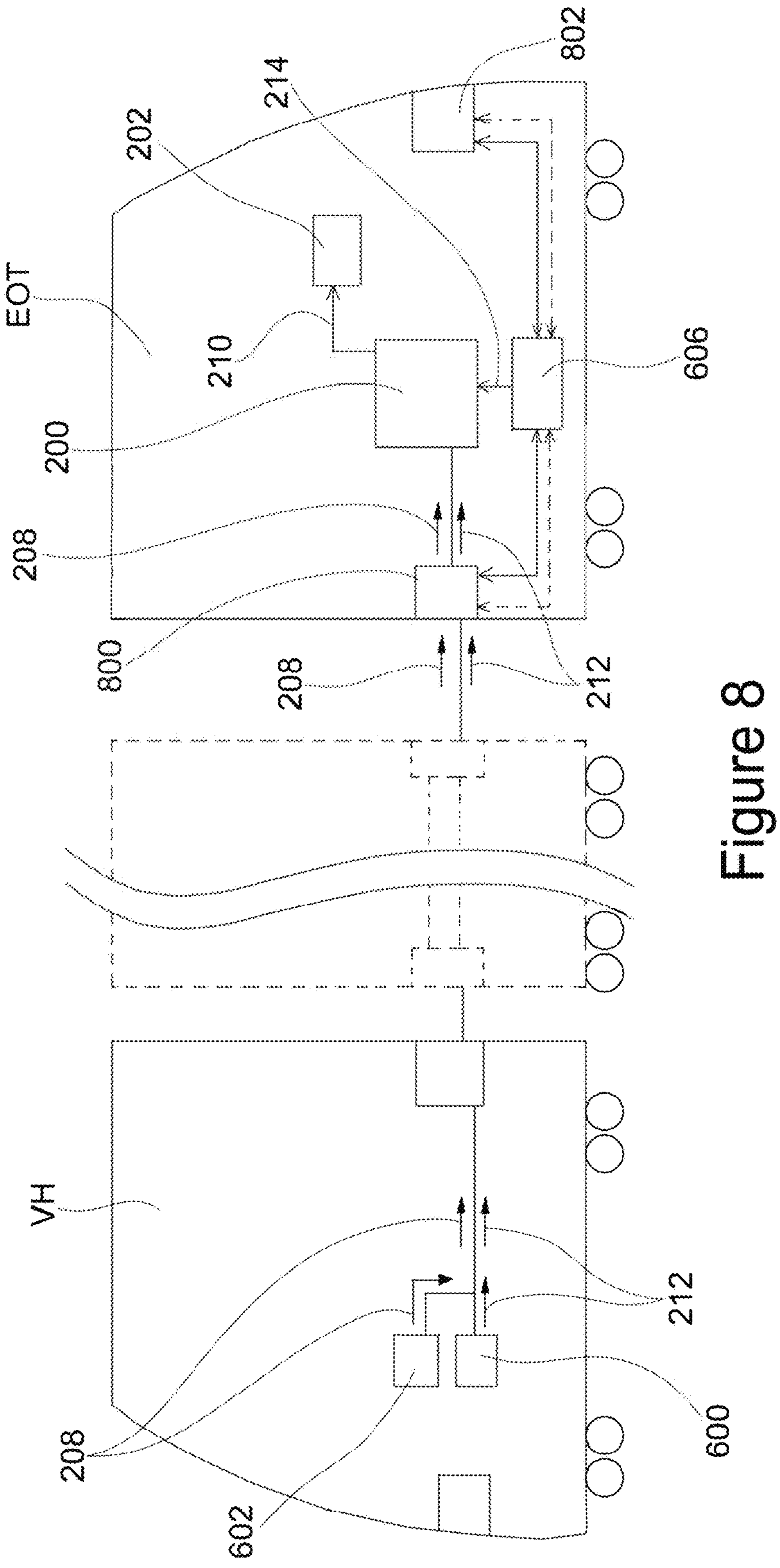
FIG. 8 shows a further embodiment of a convoy according to the present invention.

In a further embodiment, as may be observed in FIG. 8, the control element or control device 606 may comprise or be associated with:

- a first coupling means 800 arranged to allow connection of the tail vehicle EOT to a first intermediate vehicle of the convoy of vehicles or to the locomotive or lead vehicle of the convoy VH;
- a second coupling means 802 arranged to allow connection of the tail vehicle EOT to a second intermediate vehicle of the convoy of vehicles.

The control element or control device 606 may be arranged to generate the tail vehicle signal 214 when one of the first coupling means 800 and the second coupling means 802 is not connected to any vehicle in the convoy.

In other words, an intermediate vehicle, arranged between the lead vehicle or locomotive vehicle and the tail vehicle, will be connected to a preceding vehicle of the convoy by means of a first coupling means 800 and to a following vehicle of the convoy by means of a second coupling means 802. Conversely, the tail vehicle being the last vehicle in the convoy, it shall only be connected by means of the first coupling means 800 or the second coupling means 802 to a preceding vehicle, but it will not be connected to a following vehicle. When the condition exists that one of the first coupling means 800 and the second coupling means 802 is connected to a vehicle and the other if the first coupling means 800 and the second coupling means 802 is not connected to a vehicle, it is possible to determine that such vehicle is a tail vehicle.

For example, the first coupling means 800 and the second coupling means 802 may each be an automatic coupler.

Figure 9:
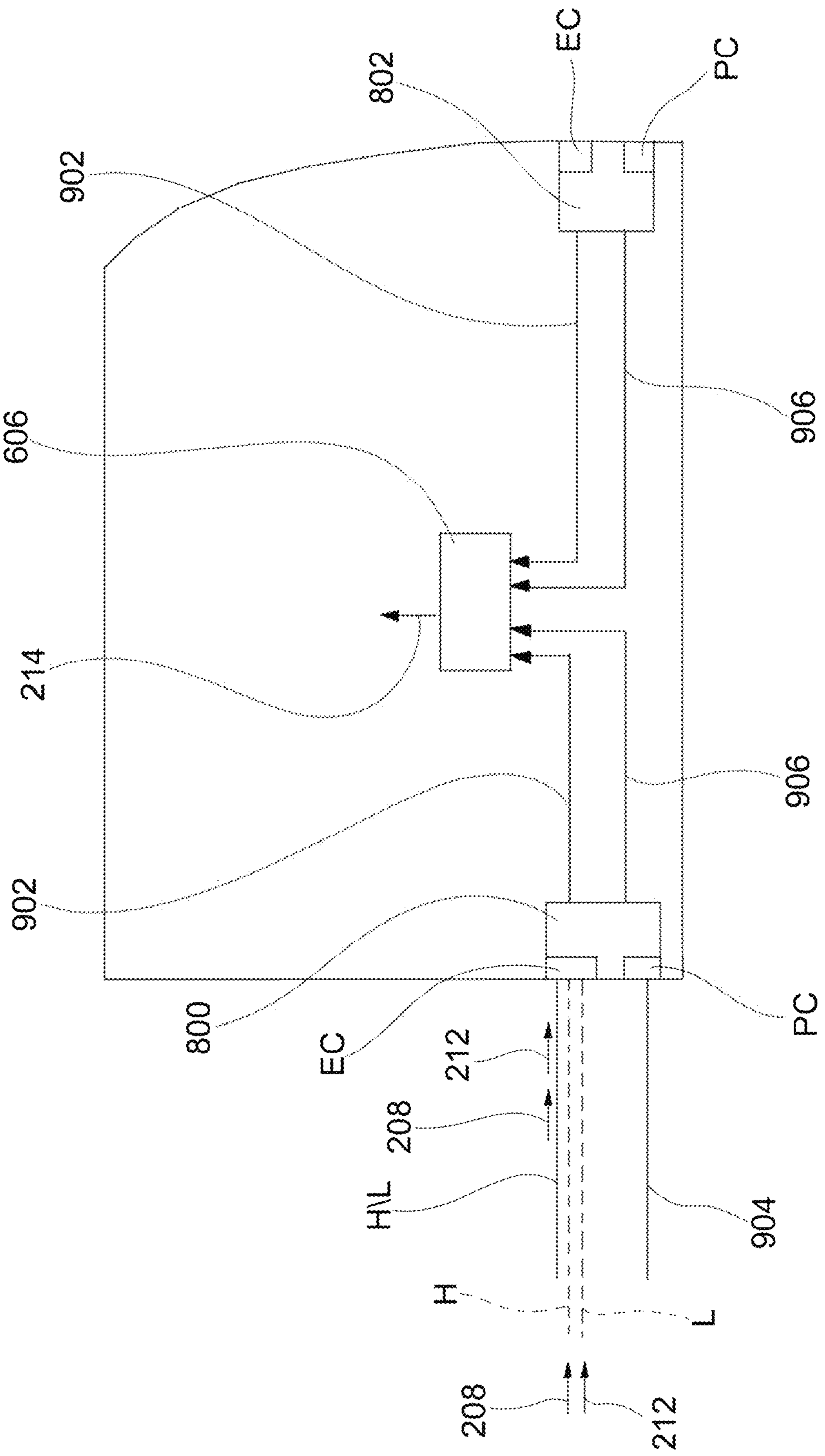
FIG. 9 shows implementation examples in relation to the generating of a tail vehicle signal.

Provided below are some implementation examples relating to the generating of the tail vehicle signal 214. For such implementation examples, reference may be made, for example, to FIG. 9.

In one exemplary embodiment, the first coupling means 800 and the second coupling means 802 may each be an automatic coupler arranged for being associated with a respective end of the vehicle. In such case, each automatic coupler may comprise an EC connection electrical connector that allows the connection of the vehicle to the high/low-voltage power supply line H/L, or to the high-voltage power supply line H and to the low-voltage power transmission line L.

When the high/low-voltage power supply line H/L is present, the automatic coupler may provide a power supply connection signal 902 to the control element or control device 606.

The power supply connection signal 902 may:

- assume a first state or first value that indicates the fact that such automatic coupler is connected to the high/low-voltage power supply line H/L by means of the EC connection electrical connector thereof;
- assume a second state or second value that indicates the fact that such automatic coupler is not connected to the high/low-voltage power supply line H/L by means of the EC connection electrical connector thereof.

When instead the high-voltage power transmission line H and the low-voltage power transmission line L are present, the automatic coupler may provide a power supply connection signal 902 to the control element or control device 606.

The power supply connection signal 902 may:

- assume a first state or first value that indicates the fact that such automatic coupler is connected to the high-voltage power transmission line H and to the low-voltage power transmission line L by means of the EC connection electrical connector thereof;
- assume a second state or second value that indicates the fact that such automatic coupler is not connected to the high-voltage power transmission line H and to the low-voltage power transmission line L by means of the EC connection electrical connector thereof.

The control element or control device 606 may be or comprise at least one logic port or a logic circuit or a control means.

The control device 606 may generate the tail vehicle signal 214 when:

- the power supply connection signal 902 originating from the first coupling means 800 (for example the first automatic coupler) has assumed the first state or the first value which indicates the fact that such automatic coupler is connected to the high/low-voltage power supply line H/L (or to the high-voltage power transmission line H and to the low-voltage power transmission line L) by means of the EC connection electrical connector thereof and the power supply connection signal 902 originating from the second coupling means 802 (for example the second automatic coupler) has assumed the second state or the second value which indicates the fact that such automatic coupler is not connected to the high/low-voltage power supply line H/L (or to the high-voltage power transmission line H and to the low-voltage power transmission line L) by means of the EC connection electrical connector thereof; or else the power supply connection signal 902 originating from the first coupling means 800 (for example the first automatic coupler) has assumed the second state or the second value which indicates the fact that such automatic coupler is not connected to the high/low-voltage power supply line H/L (or to the high-voltage power transmission line H and to the low-voltage power transmission line L) by means of the EC connection electrical connector thereof and the power supply connection signal originating from the second coupling means 802 (for example the second automatic coupler) has assumed the first state or the first value which indicates the fact that such automatic coupler is connected to the high/low-voltage power supply line H/L (or to the high-voltage power transmission line H and to the low-voltage power transmission line L) by means of the EC connection electrical connector thereof.

In a second implementation example, the first coupling means 800 and the second coupling means 802 may each be an automatic coupler arranged for being associated with a respective end of the vehicle. In such case, each automatic coupler may comprise a pneumatic coupler PC that allows the connection of the vehicle to a brake pipe 904 ("brake pipe") of the convoy.

The automatic coupler may provide a brake pipe connection signal 906 to the control element or control device 606.

The brake pipe connection signal 906 may:

assume a first state or first value that indicates the fact that such automatic coupler is connected to the brake pipe 904 by means of the pneumatic coupler PC thereof, assume a second state or second value that indicates the fact that such automatic coupler is not connected to the brake pipe 904 by means of the pneumatic coupler PC thereof.

The control element or control device 606 may be or comprise at least one logic port or a logic circuit or a control means.

The control device 606 may generate the tail vehicle signal 214 when:

the brake pipe connection signal 906 originating from the first coupling means 800 (for example the first automatic coupler) has assumed the first state or the first value which indicates the fact that such automatic coupler is connected to the brake pipe 904 by means of the pneumatic coupler PC thereof and the brake pipe connection signal 906 originating from the second coupling means 802 (for example the second automatic coupler) has assumed the second state or the second value which indicates the fact that such automatic coupler is not connected to the brake pipe 904 by means of the pneumatic coupler PC thereof, or else the brake pipe connection signal 906 originating from the first coupling means 800 (for example the first automatic coupler) has assumed the second state or the second value which indicates the fact that such automatic coupler is not connected to the brake pipe 904 by means of the pneumatic coupler PC thereof and the brake pipe connection signal 906 originating from the second coupling means 802 (for example the second automatic coupler) has assumed the first state or the first value which indicates the fact that such automatic coupler is connected to the brake pipe 904 by means of the pneumatic coupler PC thereof.

In a third implementation example, the first coupling means 800 and the second coupling means 802 may each be an automatic coupler arranged for being associated with a respective end of the vehicle.

In such case, each automatic coupler may comprise an EC connection electrical connector that allows the connection of the vehicle to the high/low-voltage power supply line H/L (or to the high-voltage power transmission line H and to the low-voltage power transmission line L, when present in place of the high/low-voltage power supply line H/L). Furthermore, each automatic coupler may comprise a pneumatic coupler PC that allows the connection of the vehicle to a brake pipe 904 ("brake pipe") of the convoy.

The automatic coupler may provide a power supply connection signal 902 to the control element or control device 606.

The power supply connection signal 902 may:

assume a first state or first value that indicates the fact that such automatic coupler is connected to the high/low-voltage power supply line H/L (or to the high-voltage power transmission line H and to the low-voltage power transmission line L, when present in place of the high/low-voltage power supply line H/L) by means of the EC connection electrical connector thereof, assume a second state or second value that indicates the fact that such automatic coupler is not connected to the high/low-voltage power supply line H/L (or to the high-voltage power transmission line H and to the low-voltage power transmission line L, when present in place of the high/low-voltage power supply line H/L) by means of the EC connection electrical connector thereof.

The automatic coupler may furthermore provide a brake pipe connection signal 906 to the control element or control device 606.

The brake pipe connection signal 906 may:

assume a first state or first value that indicates the fact that such automatic coupler is connected to the brake pipe 904 by means of the pneumatic coupler PC thereof, assume a second state or second value that indicates the fact that such automatic coupler is not connected to the brake pipe 904 by means of the pneumatic coupler PC thereof.

The control element or control device 606 may be or comprise at least one logic port or a logic circuit or a control means.

The control device 606 may generate the tail vehicle signal 214 when:

a) the power supply connection signal 902 originating from the first coupling means 800 (for example the first automatic coupler) has assumed the first state or the first value which indicates the fact that such automatic coupler is connected to the high/low-voltage power supply line H/L (or to the high-voltage power transmission line H and to the low-voltage power transmission line L, when present in place of the high/low-voltage power supply line H/L) by means of the EC connection electrical connector thereof and the power supply connection signal originating from the second coupling means 802 (for example the second automatic coupler) has assumed the second state or the second value which indicates the fact that such automatic coupler is not connected to the high/low-voltage power supply line H/L (or to the high-voltage power transmission line H and to the low-voltage power transmission line L, when present in place of the high/low-voltage power supply line H/L) by means of the EC connection electrical connector thereof; and b) the brake pipe connection signal 906 originating from the first coupling means 800 (for example the first automatic coupler) has assumed the first state or the first value which indicates the fact that such automatic coupler is connected to the brake pipe 904 by means of the pneumatic coupler PC thereof and the brake pipe connection signal 906 originating from the second coupling means 802 (for example the second automatic coupler) has assumed the second state or the second value which indicates the fact that such automatic coupler is not connected to the brake pipe 904 by means of the pneumatic coupler PC thereof, or a) the power supply connection signal 902 originating from the first coupling means 800 (for example the first automatic coupler) has assumed the second state or the second value which indicates the fact that such automatic coupler is not connected to the high/low-voltage power supply line H/L (or to the high-voltage power transmission line H and to the low-voltage power transmission line L, when present in place of the high/low-voltage power supply line H/L) by means of the EC connection electrical connector and the power supply connection signal 902 originating from the second coupling means 802 (for example the second automatic coupler) has assumed the first state or the first value which indicates the fact that such automatic coupler is connected to the high/low-voltage power supply line H/L (or to the high-voltage power transmission line H and to the low-voltage power transmission line L, when present in place of the high/low-voltage power supply line H/L) by means of the EC connection electrical connector thereof, and b) the brake pipe connection signal 906 originating from the first coupling means 800 (for example the first automatic coupler) has assumed the second state or the second value which indicates the fact that such automatic coupler is not connected to the brake pipe 904 by means of the pneumatic coupler PC thereof and the brake pipe connection signal 906 originating from the second coupling means 802 (for example the second automatic coupler) has assumed the first state or the first value which indicates the fact that such automatic coupler is connected to the brake pipe 904 by means of the pneumatic coupler PC thereof.

Preferably, the control means 202 of the tail vehicle may be arranged to perform a specific tail vehicle control function.

Preferably, the specific tail vehicle control function may comprise at least one of:

- a convoy integrity check function.
- an energization control function of the low-voltage power transmission line and/or of the high-voltage power transmission line, or an energization control function of the high/low-voltage power supply line H/L.

For example, the high-voltage power supply may derive from a high-voltage line external to the convoy of vehicles. In such case, the lead vehicle or the locomotive vehicle may comprise, for example, an energy withdrawal means such as, for example, a pantograph. The pantograph may therefore be the high-voltage power supply means 600.

For example, the low-voltage power supply may derive from a further local power energy storage means installed in the lead vehicle or of the locomotive vehicle, for example a battery.

Preferably, the convoy of vehicles is a railway convoy that comprises a plurality of railway vehicles. For example, the railway convoy is a goods train. The present invention is however applicable to any type of convoy comprising a plurality of vehicles that share a shared power supply line.

In a still further aspect, the invention relates to a control method of a control means power supply system.

Hereinafter there is described a method for supplying, by means of a power supply system, a control means residing in a vehicle intended to be part of a convoy of vehicles, particularly at least one railway vehicle intended to be part of a convoy of vehicles intended to be part of a railway convoy.

The method comprises:

- when the power supply system receives a high-voltage power supply 208 from the convoy, generating an output supply voltage 210 to be supplied to the control means 202 using such high-voltage power supply.

The method furthermore comprises:

- when the power supply system does not receive the high-voltage power supply 208 of the convoy and a local power energy storage means 204 of the power supply system is capable of supplying a supplementary power supply 206 greater than or equal to a predetermined minimum power supply, generate said output supply voltage 210 to be supplied to the control means 202 using the supplementary power supply 206 provided by said local power energy storage means 204.

The method further comprises:

- when the vehicle V on which the power supply system is installed is a tail vehicle, the power supply system does not receive the high-voltage power supply, and the local power energy storage means 204 is not capable of providing a supplementary power supply 206 greater than or equal to said predetermined minimum power supply, generate said output supply voltage 210 using the low-voltage power supply 212.

Preferably, when the high-voltage power supply 208 is an alternating-current power supply and the output supply voltage 210 is a direct-current power supply, the method may comprise:

- converting said high-voltage power supply 208 in alternating-current into the output supply voltage 210 in direct-current.

Preferably, when the low-voltage power supply 212 is an alternating-current power supply the output supply voltage 210 is a direct-current power supply, the method may comprise:

- converting said low-voltage power supply 212 in alternating-current into the output supply voltage 210 in direct-current.

Preferably, when said low-voltage power supply 212 is a direct-current power supply, the method may comprise:

- converting/regulating said low-voltage power supply 212 in alternating-current into the output supply voltage 210 in direct-current.

The advantage obtained is therefore that of having provided a solution that allows a control means of a tail vehicle to be able to perform at least one specific a tail vehicle control function with a high level of availability, also in case of absence of a high-voltage power supply ("high power") and under conditions of a discharged local power energy storage means of the tail vehicle.

Various aspects and embodiments have been described of a power supply system for a control means residing in a vehicle intended to be part of a convoy of vehicles, of a convoy of vehicles and of a method for supplying power, by means of a power supply, to a control means residing in a vehicle intended to be part of a convoy of vehicles, according to the invention. It is understood that each embodiment may be combined with any other embodiment. Moreover, the invention is not limited to the embodiments described, but may be varied within the scope defined by the appended claims.

The invention claimed is:

1. A power supply system for a control means residing in a vehicle (V) intended to be part of a convoy of vehicles, particularly at least one railway vehicle intended to be part of a railway convoy, the power supply system comprising:

a local power energy storage means arranged to be installed in said vehicle (V) and adapted to provide a supplementary power supply;

the power supply system being arranged to:

receive as input a high-voltage power supply;

output a supply voltage arranged to be supplied to said control means;

the power supply system being arranged to:

when it receives the high-voltage power supply, use said high-voltage power supply to generate said output supply voltage;

when it does not receive the high-voltage power supply and said local power energy storage means is capable of providing a supplementary power supply greater than or equal to a predetermined minimum power supply, use the supplementary power supply provided by said local power energy storage means to generate said output supply voltage;

wherein the power supply system is arranged to additionally receive a low-voltage power supply and at least one tail vehicle signal arranged to indicate whether the vehicle (V) on which the power supply system is installed is a tail vehicle of the convoy of vehicles;

the power supply system being also arranged to use said low-voltage power supply to generate said output supply voltage, when:

the at least one tail vehicle signal indicates that the vehicle (V) on which the power supply system is installed is a tail vehicle;

said power supply system does not receive the high-voltage power supply; and said local power energy storage means is not capable of providing supplementary power supply greater than or equal to said predetermined minimum power supply.

2. The power supply system according to claim 1, wherein:

said power supply system is arranged to receive as input said high-voltage power supply in alternating current; and said output supply voltage arranged to be supplied to said control means is in direct-current;

said power supply system further comprising a first AC/DC conversion means arranged to receive said high-voltage power supply in alternating current and convert it into the output supply voltage in direct-current.

3. The power supply system according to claim 2, wherein:

said power supply system is arranged to receive as input said low-voltage power supply in alternating-current;

said first AC/DC conversion means being arranged to receive said low-voltage power supply in alternating-current and convert it into the output supply voltage in direct-current.

4. The power supply system according to claim 3, comprising a switching means arranged to assume, depending upon the tail vehicle signal, a first condition adapted to allow the supply of an activation signal to the first AC/DC conversion means and a second condition adapted to prevent the supply of the activation signal to the first AC/DC conversion means;

wherein said first AC/DC conversion means, when it receives the activation signal is arranged to receive as input said low-voltage power supply in alternating-current and convert it into the output supply voltage in direct-current arranged to be supplied to the control means;

wherein said first AC/DC conversion means, when it does not receive the activation signal, is arranged to:

if it receives the high-voltage power supply in alternating-current, convert said high-voltage power supply in alternating-current into the output supply voltage in direct-current arranged to be supplied to the control means.

5. The power supply system according to claim 2, wherein said power supply system is arranged to receive as input said low-voltage power supply in alternating-current;

the power supply system comprising a second AC/DC conversion means arranged to receive said low-voltage power supply in alternating-current and convert it into the output power supply voltage in direct-current.

6. The power supply system according to claim 5, comprising a switching means (406) arranged to assume, depending upon the tail vehicle signal, a first condition adapted to allow the supply of an activation signal (408) to the second AC/DC conversion means and a second condition adapted to prevent the supply of the activation signal (408) to the second AC/DC conversion means;

wherein said second AC/DC conversion means, when it receives the activation signal (408) is arranged to receive as input said low-voltage power supply in alternating-current and convert it to the output supply voltage in direct-current arranged to be supplied to the control means;

wherein said second AC/DC conversion means, when it does not receive the activation signal (408), is arranged to provide no output supply voltage (410).

7. The power supply system according to claim 1, wherein said power supply system is arranged to receive as input said low-voltage power supply in direct-current;

the power supply system comprising a DC/DC conversion means arranged to receive said low-voltage power supply in direct-current and convert it into the output supply voltage in direct-current arranged to be supplied to the control means.

8. The power supply system according to claim 7, comprising a switching means arranged to assume, depending upon the tail vehicle signal, a first condition adapted to allow the supply of an activation signal to the DC/DC conversion means and a second condition adapted to prevent the supply of the activation signal to the DC/DC conversion means;

wherein said DC/DC conversion means, when it receives the activation signal is arranged to receive as input said low-voltage power supply in direct-current and convert it into the output supply voltage in direct-current arranged to be supplied to the control means;

wherein said DC/DC conversion means, when it does not receive the activation signal, is arranged to provide no output supply voltage.

9. The power supply system according to claim 1, comprising an activation circuit arranged to receive as input the supplementary power supply provided by said local power energy storage means and said low-voltage power supply;

wherein, when said activation circuit receives as input the low-voltage power supply and said supplementary power supply is greater than said minimum power supply, the activation circuit is arranged to provide as output the supplementary power supply provided by said local power energy storage means;

the supplementary power output from the activation circuit being supplied at the output of the power supply system and being arranged to be supplied to said control means.

10. A convoy of vehicles, particularly a railway convoy of railway vehicles, the convoy comprising:

at least one locomotive or lead vehicle (VH);

at least one tail vehicle (EOT);

the locomotive or lead vehicle (VH) comprising a high-voltage power supply means arranged to provide a high-voltage power supply and a low-voltage power supply means arranged to provide a low-voltage power supply;

the tail vehicle (EOT) comprising:

a power supply system according claim 1;

the convoy of vehicles further comprising:

a high-voltage power transmission line (H) arranged to allow the supply of the high-voltage power supply from the high-voltage power supply means of the locomotive or lead vehicle (VH) to the power supply system of the tail vehicle (EOT), and a low-voltage power transmission line (L) arranged to allow the supply of the low-voltage power supply from the low-voltage power supply means of the locomotive or lead vehicle (VH) to the power supply system of the tail vehicle (EOT); or a high/low-voltage power supply line (H/L) arranged to allow both the supply of the high-voltage power supply from the high-voltage power supply means of the locomotive or lead vehicle (VH) to the power supply system of the tail vehicle (EOT) and the supply of the low-voltage power supply from the low-voltage power supply means of the locomotive or lead vehicle (VH) to the power supply system of the tail vehicle (EOT);

the tail vehicle (EOT) comprising at least one control element or control device arranged to generate the tail vehicle signal arranged to indicate whether the vehicle on which the power supply system is installed is a tail vehicle (EOT) of the convoy of vehicles.

11. The convoy of vehicles according to claim 10, wherein the convoy of vehicles comprises a communication line arranged to connect a control means of the locomotive or lead vehicle to the control means of the tail vehicle;

said control means of the tail vehicle comprising, or being associated with, at least a first communication port (P1) and a second communication port (P2);

the first communication port (P1) being arranged to be connected to a first line section (S1) of the communication line;

the second communication port (P2) being arranged to be connected to a second line section (S2) of the communication line, distinct from said first line section (S1);

said control element or control device being arranged to generate the tail vehicle signal when:

the first communication port (P1) of the control means of the tail vehicle is connected to the first line section (S1) and the second communication port (P2) of the control means of the tail vehicle is not connected to the second line section (P2); or the first communication port (P1) of the control means of the tail vehicle is not connected to the first line section (S1) and the second communication port (P2) of the control means of the tail vehicle is connected to the second line section (S2).

12. The convoy of vehicles according to claim 10, wherein said control element or control device comprises or is associated with:

a first coupling means arranged to allow connection of the tail vehicle (EOT) to a first intermediate vehicle of the convoy of vehicles or to the locomotive or lead vehicle of the convoy (VH);

a second coupling means arranged to allow the connection of the tail vehicle (EOT) to a second intermediate vehicle of the convoy of vehicles;

said control element or control device being arranged to generate the tail vehicle signal when:

one of the first coupling means and the second coupling means is not connected to any vehicle in the convoy.

13. The convoy of vehicles according to claim 10, wherein said control means of the tail vehicle is arranged to perform a specific tail vehicle control function.

14. The convoy of vehicles according to claim 13, wherein said specific tail vehicle control function comprises at least one of:

a convoy integrity check function;

an energization control function of the low-voltage power transmission line and/or high-voltage power transmission line, or an energization control function of a the high/low voltage power supply line (H/L).

15. A method for supplying power supply, via a power supply system, to a control means residing in a vehicle (V) intended to be part of a convoy of vehicles, particularly at least one railway vehicle intended to be part of a railway convoy, comprising the steps of:

when the power supply system receives a high-voltage power supply from the convoy, generating an output supply voltage to be supplied to the control means using the high-voltage power supply;

when the power supply system does not receive a high-voltage power supply of the convoy and a local power energy storage means of the power supply system is capable of supplying a supplementary power supply greater than or equal to a predetermined minimum supply, generating said output supply voltage to be supplied to the control means using the supplementary power supply provided by said local power energy storage means;

when the vehicle (V) on which the power supply system is installed is a tail vehicle, the power supply system does not receive the high-voltage power supply, and the local power energy storage means is unable to provide a supplementary power supply greater than or equal to said predetermined minimum power supply, generating said output supply voltage using the low-voltage power supply.

* * * * *